United States Patent
Le Maguet et al.

(10) Patent No.: US 6,219,100 B1
(45) Date of Patent: Apr. 17, 2001

(54) COMMUNICATION METHOD BETWEEN STATIONS

(75) Inventors: Yann Le Maguet, Paris; Marcel Le Queau, Ozoir-la-Ferriere; Ludovic Lauer, Paris, all of (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/983,372

(22) PCT Filed: May 28, 1997

(86) PCT No.: PCT/IB97/00605

§ 371 Date: Jan. 16, 1998

§ 102(e) Date: Jan. 16, 1998

(87) PCT Pub. No.: WO97/46024

PCT Pub. Date: Dec. 4, 1997

(30) Foreign Application Priority Data

May 30, 1996 (EP) .................................................. 96401161
Mar. 25, 1997 (EP) .................................................. 97400672

(51) Int. Cl.[7] .................................................. H04N 7/52
(52) U.S. Cl. .................................... 348/384.1; 348/385.1

(58) Field of Search .................................. 348/384, 384.1, 348/385.1, 388.1

(56) References Cited

U.S. PATENT DOCUMENTS 6,031,577 * 2/2000 Ozkan et al. .......................... 348/465
6,064,676 * 5/2000 Slattery et al. ....................... 370/412

FOREIGN PATENT DOCUMENTS

0374548A2 6/1990 (EP) ................................. H04N/7/13

* cited by examiner

Primary Examiner—Melvin Marcelo
(74) Attorney, Agent, or Firm—Daniel J. Piotrowski

(57) ABSTRACT

A method is disclosed for communication between a plurality of stations. The method includes selecting a master station, which becomes responsible for building and broadcasting at least one service information table (such as the tables defined in MPEG or DVB), and communicates with the (N−1) to the other stations, known as slave stations, in a limited number of situations corresponding to modifications of the content of the tables and according to a specific table management, where the master station is always in one of three states that are either a waiting state, or a building state, or a transferring state, and specific communication rules for the slave stations and the master station.

4 Claims, 4 Drawing Sheets

COMMUNICATION METHOD BETWEEN STATIONS

BACKGROUND OF THE INVENTION

The invention relates to a communication method between N stations among which one is selected as a master station and becomes responsible for building and broadcasting at least one service information table such as the tables defined according to standards like MPEG or DVB, said master station communicating with the (N—1) other ones, called slave stations, according to a specific table management, and in a limited number of situations.

The standards MPEG and DVB have defined various service information tables describing the transport stream content. In MPEG case, these tables are referred to as PSI tables (Program Specific Information), while in DVB case, they are referred to as SI tables (Service Information). They provide the minimum information to enable an automatic configuration of the receiver to demultiplex and decode the various streams of programs within a multiplexed transport stream.

In an independent broadcast system, each station transmits independently its own tables, without taking care of what the other stations broadcast and without any communication between stations. Such an independent broadcast system is the simplest one, but possible only if some constraining conditions are fulfilled (e.g. the version number and section numbers have to be independent from station to station, section interleaving shall not be possible, . . . ), which is unfortunately not always the case.

In a central broadcast system as illustrated in FIG. 1 (that shows an emitting station 10 (ES) sending to a customer 12 (CM) a multiplexed stream MXS emitted by a multiplexor MUX 14 that receives several programs 1 to N), a station becomes responsible for building and broadcasting the tables for all the other stations, without communicating with them. The building and the transmission of these tables are relatively easy since the station 10 generating the transport stream knowns their content. Such a situation is however reserved to tables which are global (i.e. not service oriented) and for which no information is needed from the other stations.

OBJECTS AND SUMMARY OF THE INVENTION

It is therefore an object of the invention to propose another kind of communication method, that is organised as indicated in the preamble of the description and wherein said situations are the three following ones:

a slave station wants to update the content of its tables;
a slave station wants to remove its tables;
the master station wants to refresh the tables of at least one of the slave stations; and said table management is based on transmission orders, used when the master station has to refresh a table, and stop transmission orders, used when the master station has to modify the content of a table by updating or removing it.

Such a method allows to implement a solution where all the stations receive a remultiplexed stream and one of them is responsible for building the tables.

In a particular embodiment, the table management is carried out by means of the following principle, according to which the master station is always in one of three states that are either a waiting state, or a building state, or a transferring state, the following operations corresponding to said states:

(i) in the waiting state, the master station refuses any modification of the content of any table except when one of the two following events occurs: either it is time to refresh at least one of the tables, or a slave station modifies its own contribution to one of the tables;

(ii) one of said events having occurred, the master station transmits respectively a transmission order or a stop transmission order, and the building state begins, during which said master station stores all modifications;

(iii) said modifications being stored, the transferring state begins, during which other modifications are no longer allowed and all modifications are copied, said master station finally returning to its waiting state.

Preferably, the communication rules for said operations are subdivided into rules to be respected by any slave station and rules to be respected by the master station, the former ones being the following:

(a) a slave station can transmit a modification only if it has received from the master station a transmission order concerning a table or if it wants to update its own contribution to a table;

(b) a slave station can update its own contribution to a table only if it has not received any order concerning said table since a predetermined period;

(c) when a slave station receives from the master station a transmission order concerning a table, said transmission has to be done within a predetermined period;

(d) when a slave station receives from the master station a stop transmission order concerning a table, it has to finish a pending transmission within a predetermined period and will be no longer able to begin a further transmission during a predetermined period;

while the latter ones are the following:

(e) when the master station wants to refresh a table, it has to transmit a transmission order for said table;

(f) the master station can send a transmission order only if it has not transmitted one during a predetermined previous period;

(g) when the master station receives modifications sent by a slave station wanting to update its contribution to a table, it has to transmit a stop transmission order for said table.

After the transmission of a transmission order or a stop transmission order, the master station then generally carries out the following operations:

(i) all the modifications are first stored during a first predetermined period;

(ii) after said period, all the modifications are copied during a second predetermined period.

BRIEF DESCRIPTION OF THE DRAWINGS

The particularities and advantages of the invention will become more apparent from the following description and the accompanying drawings, in which.

DETAILED DESCRIPTION OF THE PREFERRED EMBODIMENT

Figure 1:
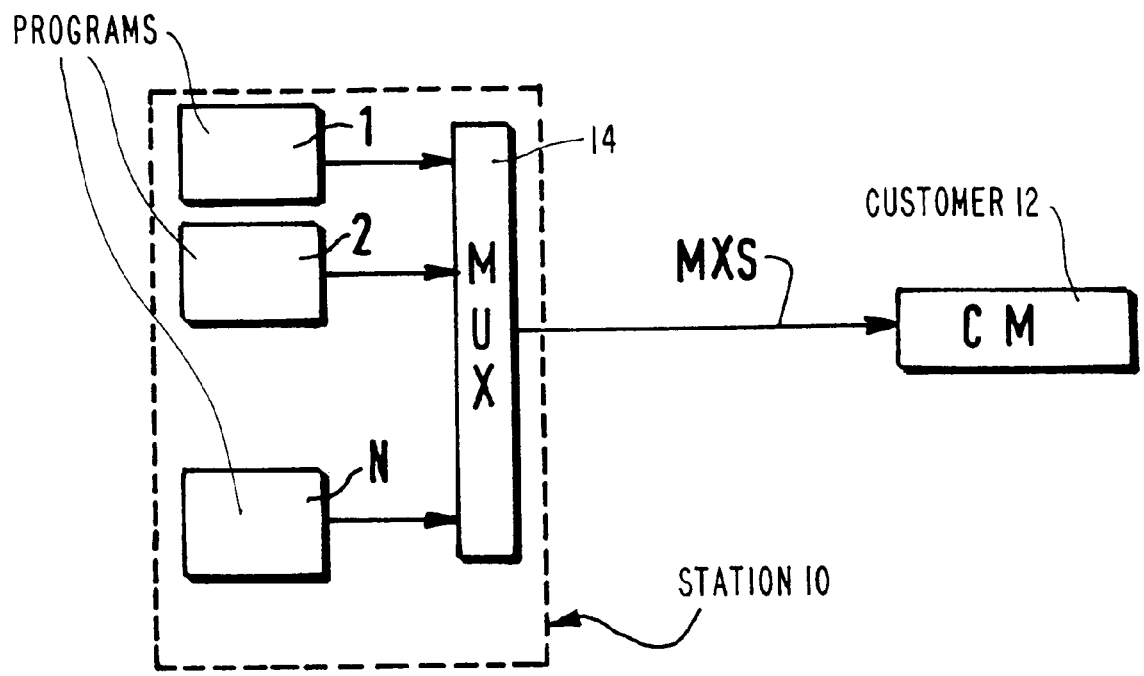
FIGS. 1 and 2 are schematic representations of central and distributed broadcast systems respectively.
Figure 2:
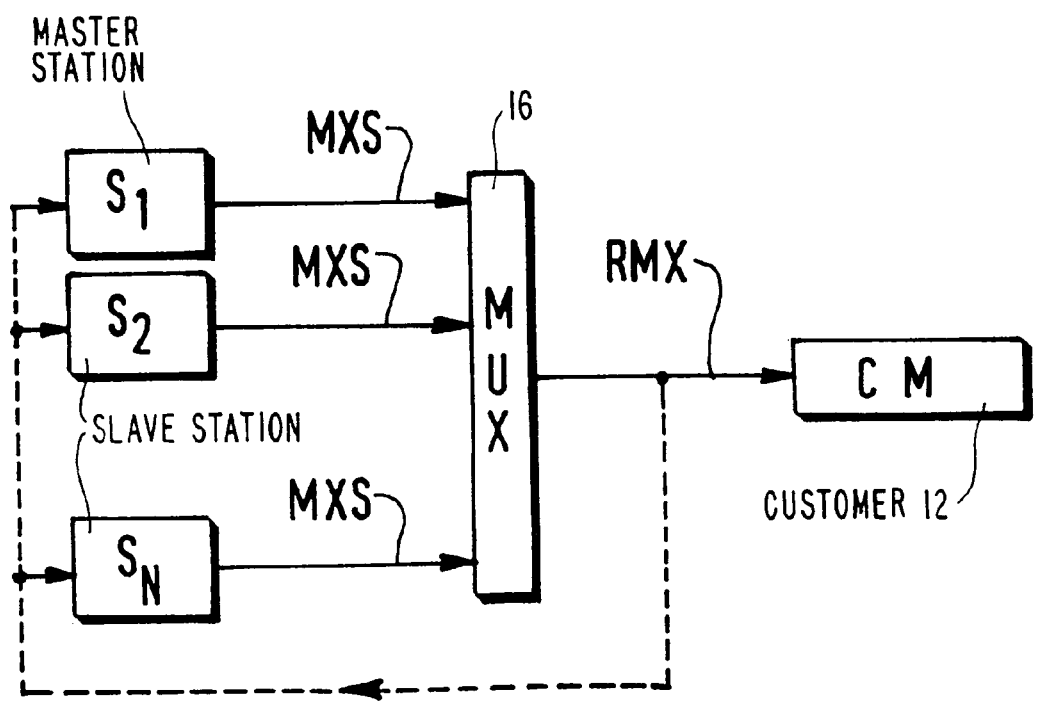

Before describing the solution that allows to transmit said PSI/SI tables (defined in MPEG and DVB) for a distributed broadcast system, it is useful to recall the following definitions, in order to remove any possible ambiguity:

transport stream: stream that respects the transport format defined by MPEG;

multiplexing: operation consisting in concatenating several streams into one transport stream;

multiplexed stream: stream that contains several programs and that respects the transport format defined by MPEG;

central broadcast system: system in which the multiplexed stream received by the customers is generated by only one emitting station (such as shown in FIG. 1);

distributed broadcast system: system in which the multiplexed stream received by the customers is obtained by remultiplexing various transport streams, each of which is generated by an independent station (such as shown in FIG. 2, where stations 1 to N send to the customer CM a remultiplexed stream RMX obtained at the output of a multiplexer MUX receiving the multiplexed stream MXS respectively available at the outputs of said stations).

In MPEG, four PSI tables are defined: CAT, NIT, PAT and PMT. These tables, that include data providing the minimum information to enable automatic configuration of the receiver to demultiplex and decode the various streams of the programs within a multiplexed stream (=transport stream), have the following meanings:

CAT (Conditional Access Table): it provides information on the conditional access systems used in the multiplex (its syntax is neither defined in MPEG nor in DVB, and the information it carries is completely private, but includes the location of the EMM—Entitlement Management Message-streams, when applicable);

NIT (Network Information Table): it provides information about the physical network (its syntax is defined in DVB);

PMT (Program Map Table): to each program corresponds a PMT, and this PMT indicates the PID (Packet IDentifier) of the transport packets that carry the Program Clock Reference (PCR) and the PID of the streams that make up the program (its syntax is completely defined in MPEG);

PAT (Program Association Table): for each program (=service in DVB), the PAT indicates the PID of the transport packets carrying the corresponding PMT (its syntax is completely defined in MPEG).

In DVB, new tables have been introduced and some of them (EIT, SDT, TDT) are mandatory. These DVB mandatory tables have the following meanings:

EIT (Event Information Table): it contains data that describe the events constituting the services, e.g. event name, start time, duration, . . . ;

SDT (Service Description Table): it contains data that describe the services (programs) present in a system, e.g. names of the services, service providers, . . . ;

TDT (Time and Date Table): it gives information related to the present time and date.

Different broadcast policies can therefore be implemented depending on table properties. It was already seen that independent or central broadcast systems, although simple, are not an appropriate solution.

A third policy, that is the proposed solution according to the invention, will now be described. Its basic principle consists in selecting one of the stations $S_2$ of FIG. 2 (called the master station) as the responsible one for building and broadcasting the tables. This master station, $S_2$, then receives from the other ones $S_1$–$S_N$ (called slave stations) their respective contributions in the various tables. The communication between the master station and the slave ones is done thanks to the remultiplexed stream via MUX 16 (connection in dotted line in FIG. 2) and by using a private protocol.

The following notations will be used in the description:

T1 is the maximum delay needed by a slave station to output its contribution to a table;

D(st) is the maximum propagation delay of a packet from one station to another one;

D(tr) is the delay needed by the master station to replace the current version of a table by the modified one T2 is the sum of these delays:
T2=T1+D(st)+D(tr)

T3 is equal to the sum of T2 and D(st):
T3=T1+2D(st)+D(tr).

Having defined these preliminary notations, the table management, first in the slave stations and then in the master station, will be explained.

Concerning first the table management in the slave stations, each slave station builds its own SI tables (PAT, CAT, SDT, EIT, . . . ) by considering that it is alone in the system. It then transmits these tables to the master station by using special packets called SI_modif_Packets, but only in the following cases, in order to reduce the communication data rate:

(a) the concerned slave station wants to modify the contents of its tables (for instance because new services are present, or because the current SI tables transmitted by the master station do not correspond to what the slave station wants);

(b) the slave station wants to remove its tables (the station wants to stop transmitting);

(c) the slave station has received a transmission order from the master one (e.g. the master station wants to refresh the tables, generally for security purposes).

As indicated for instance in the european patent application EP 0374548, the general technique of packetising separate data streams is already known in the field of data communication and video transmission. However, in the present case, a particular table management and specific communication rules are provided. An example of syntax of the SI_modif_Packets is given hereunder, with the corresponding number of bits:

| | |
|---|---|
| sync_byte | 8 |
| transport_error indicator | 1 |
| payload_unit_start_indicator | 1 |
| transport_priority | 1 |
| PID | 13 |
| transport_scrambling_control | 2 |
| adaptation_field_control | 2 |
| continuity_counter | 4 |
| adaptation_field_length | 8 |
| discontinuity_indicator | 1 |
| random_access_indicator | 1 |
| elementary_stream_priority_indicator | 1 |
| PCR_flag | 1 |
| OPCR_flag | 1 |
| splicing_point_flag | 1 |
| transport_private_data_flag | 1 |
| adaptation_field_extension_flag | 1 |
| private_data : | |
|     transport_private data_length | 8 |

| | |
|---|---|
| Table_Type | 8 |
| Table_Start | 1 |
| Table_End | 1 |
| reserved | 6 |
| version_number | 8 |
| last_section_number | 8 |
| stuffing_byte | 8 |
| pointer_field | 8 |
| SI_data_bytes | 8 |

Concerning the table management in the master station, two kinds of orders can be transmitted by said master station in order to communicate with the slave stations: transmission orders, stop transmission orders. The transmission orders are used when the master station wants to refresh a table (as already seen, generally for security purposes), while the stop transmission orders are used when the master station wants to modify the content of a table. These orders are transmitted by using special packets called Order_Packets, the syntax of which is given below, also with the corresponding number of bits:

| | |
|---|---|
| sync_byte | 8 |
| transport_error_indicator | 1 |
| payload_unit_start_indicator | 1 |
| transport_priority | 1 |
| PID | 13 |
| transport_scrambling_control | 2 |
| adaptation_field_control | 2 |
| continuity_counter | 4 |
| adaptation_field_length | 8 |
| discontinuity_indicator | 1 |
| random_access_indicator | 1 |
| elementary_stream_priority_indicator | 1 |
| PCR_flag | 1 |
| OPCR_flag | 1 |
| splicing_point_flag | 1 |
| transport_private_data_flag | 1 |
| adaptation_field_extension_flag | 1 |
| private_data : | |
| transport_private_data_length | 8 |
| Table_Type | 8 |
| Transmission flag | 1 |
| reserved | 7 |
| stuffing_byte | 8 | with, for some indications present in the two above-given tables, the following meanings:
   Table_Type: identifies which table is concerned by the order;
   Table_Start: when set to 1, then the contribution of the slave station to the table defined by Table_Type starts with the first SI_data_byte present in the packet;
   Table_End: when set to 1, then the contribution of the slave station to the table defined by Table_Type ends with the last SI_data_byte present in the packet;
   Transmission_flag: when set ot 1, then the order is a transmission order, otherwise it is a stop transmission order;
   SI_data_bytes: they respect the format of the SI as specified both in MEPG and DVB;
   version_number: is used in order to identify whether the contribution of the concerned slave station has been modified or not;
   last_section_number: the sections of the contribution of a slave station are numbered from 0 to last_section_number.

Figure 3:
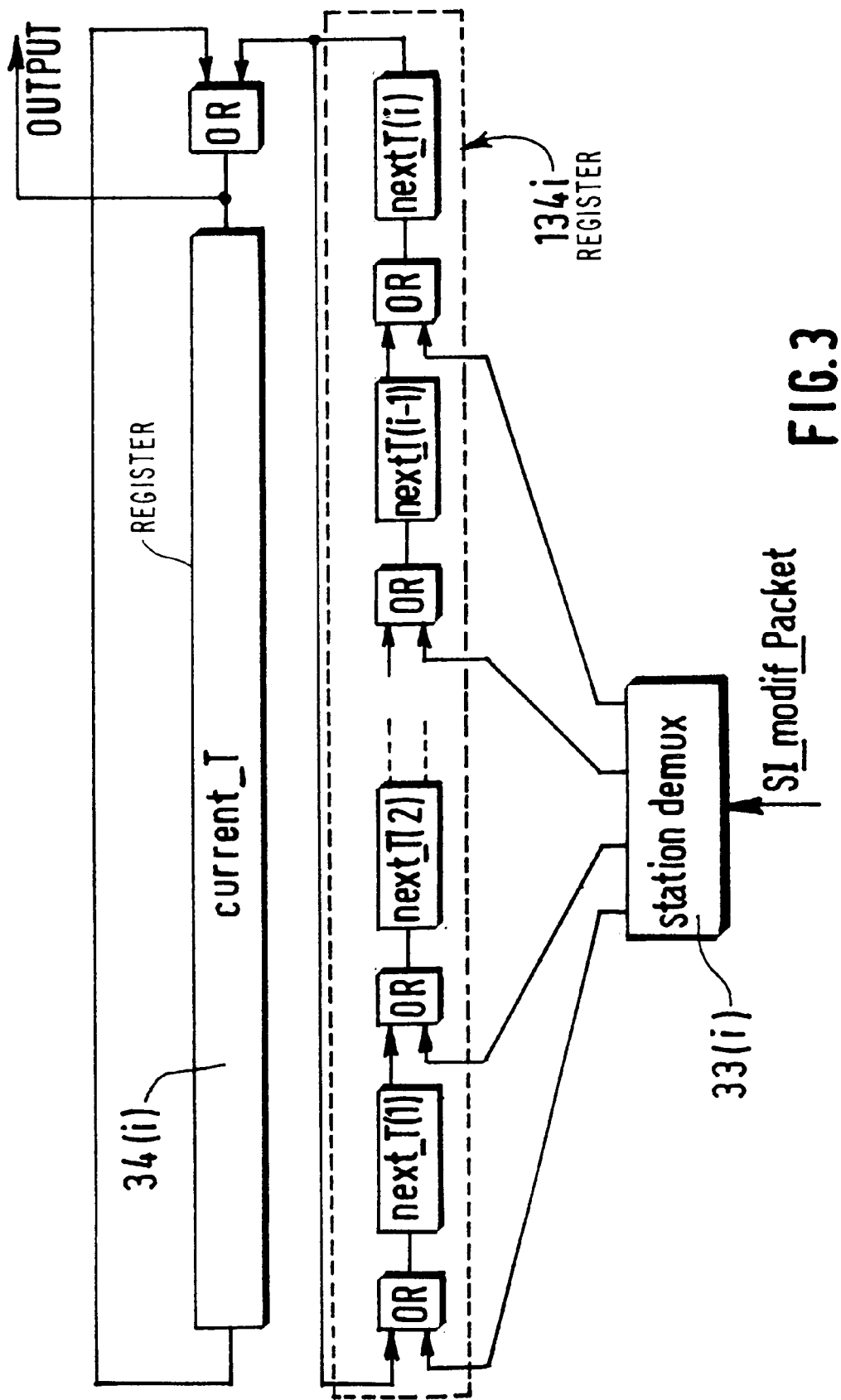
FIGS. 3 and 4 respectively illustrate the processing principles in the master station for a table T and a more general overview of the SI processing principles.
Figure 4:
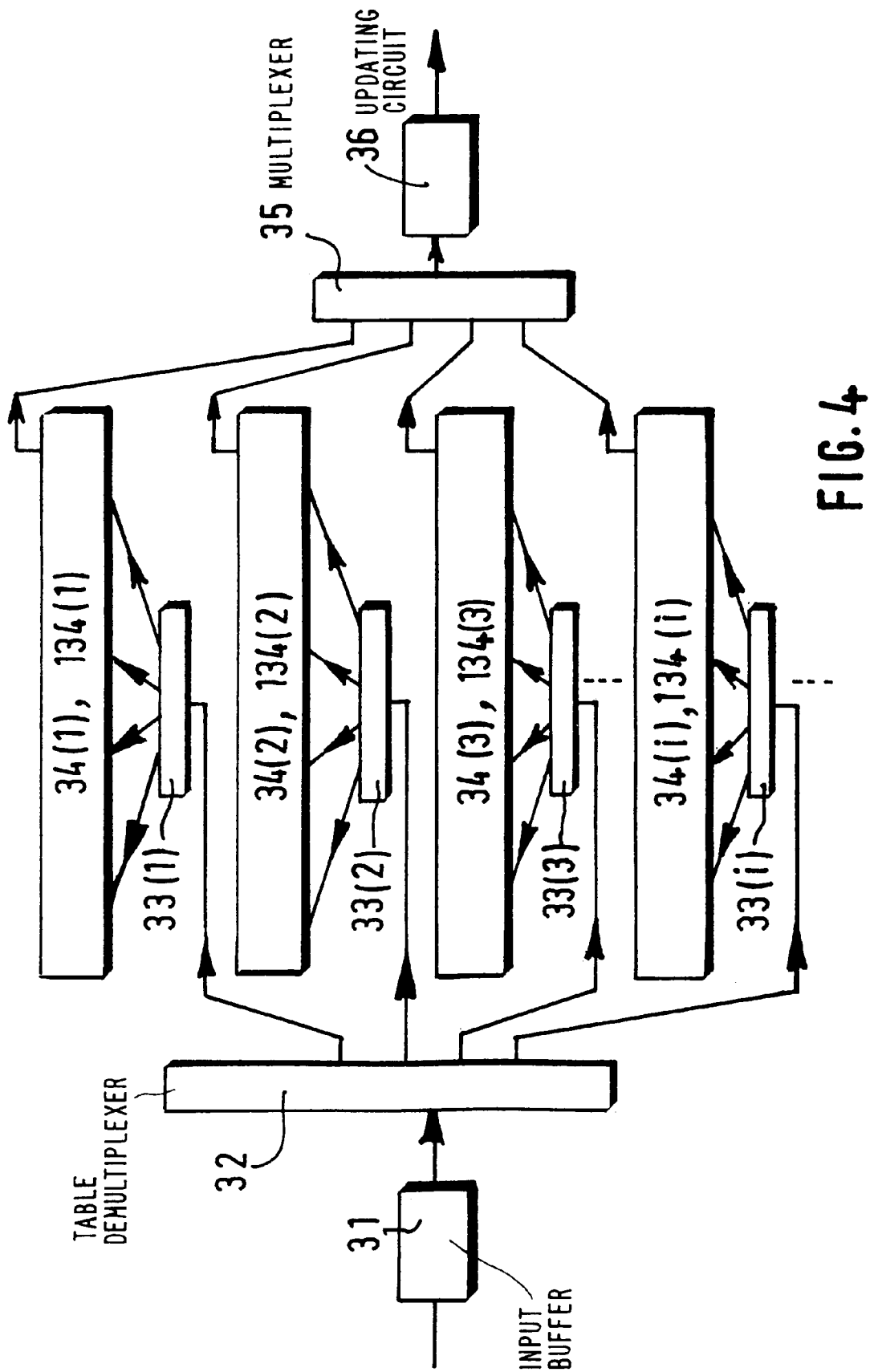

The table management is therefore carried out according to principles that will be now described, in relation with FIGS. 3 and 4 that respectively illustrate the processing principles in the master station for a table T and a more general overview of the SI processing principles. As shown in said figures, two kinds of registers (34, 134) are present in the master station: current_T, that contains at each time the version of the table T which is currently transmitted, and next_T, that contains at each time a part of or the total contribution of a station and is therefore the version of the table T which shall replace current_T (next_T(1) is the contribution of the station 1 in next_T, next_$_T$(2) for the station 2, and so on . . . ).

At the output of an input buffer 31, a table demultiplexer 32 and station demultiplexers 33 (1), 33 (2), . . . , 33(i), . . . , allow to receive the SI_modif_Packets and to transfer them in the appropriate next_T register (referenced 134(i) for the station i) and then in the register current_T (referenced 34 (i) for the station i). An example of each sub-assembly (33(i), 134(i), 34 (i)) is shown in FIG. 3, as already indicated. At the output of said registers (34(1), 34(2), . . . 34(i), . . . , a multiplexer 35 transmits the different SI tables according to their repetition rates and transmits orders when a table has to be refreshed or updated, and an updating circuit 36 then modifies correctly the appropriate fields of the concerned table.

For each table T, the master station is always in one of the three following states: waiting state (the station waits for a new contribution), building state (the next version of the table T is being completed), transferring state (the next version of the table T becomes the current one).

Most of the time, the station is in the waiting state, during which it has to refuse all the received SI_modif_Packets(T) excepted when one of the two following events occurs: (i) it is time to refresh the table T, (ii) the station receives a SI_modif_Packet (T) starting with a new contribution (i.e Table_Start is set to 1). When such events occur, the master station transmits an Order_Packet (a transmission order in case (i), or a stop transmission order in case (ii)). The building state then begins, during which the master station stores all the received SI_modif_Packets(T) in the corresponding next_T(i). The master station stays in this building state during the period T1+2D(st). Then the tranferring state begins, during which all the next_T(i) are copied into current_T and no SI_modif_Packet(T) is accepted anymore. The master station stays in the tranferring state during D(tr) and then returns to the waiting state.

This above-described table management is carried out according to some communication rules that will be now indicated.

These communication rules for the transmission orders and the stop transmission orders may be subdivided in rules to be respected by a slave station and rules to be respected by the master station.

Figure 5:
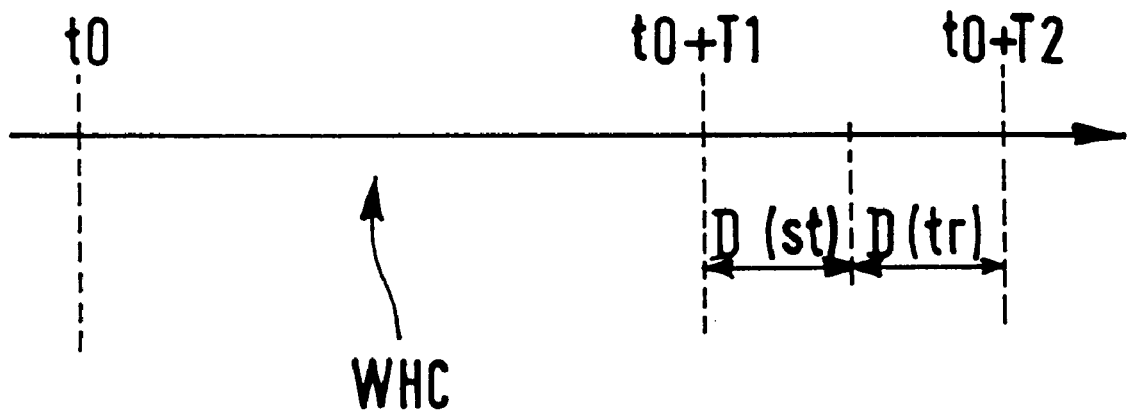
FIGS. 5 and 6 illustrate in two cases the rules applied by a slave station when it receives an order packet.
Figure 6:
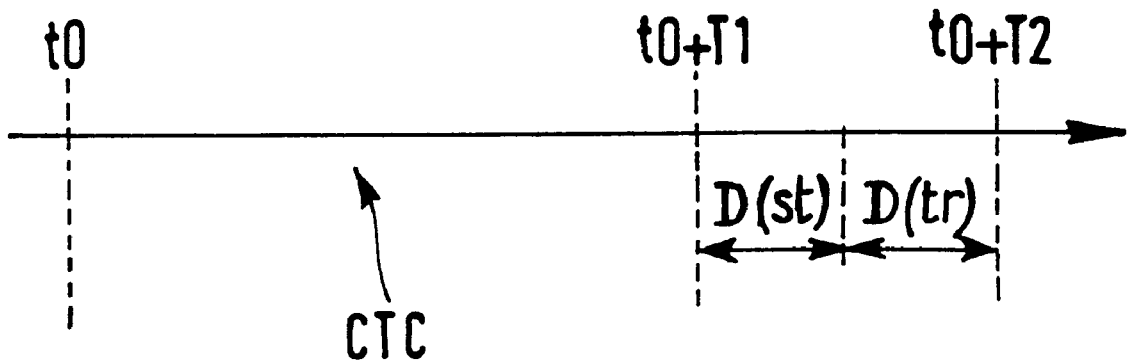

The rules to be respected by a slave station are the following:
   (a) a slave station can transmit an SI_modif_Packet(T) only if it has received from the master station a transmission order concerning the table T (see also rule(c)) or if it wants to update its own contribution to said table T (see also rule (b));
   (b) a slave station can however update its own contribution to said table T if and only if it has not received any order concerning this table T since a period equal to the delay T2
   (c) when a slave station receives from the master station a transmission order at a time t0 concerning a table T (the master station wants to refresh said table), it has to transmit its whole contribution WHC concerning said table T within the interval (t0, t0+delay T1) and, once this transmission is finished, it has to wait till the time (t0+delay T2) before being able to transmit an SI_modif_Packet (this is illustrated in FIG. 5, where are indicated:
the times t0, (t0+T1), (t0+T2);
the delays D(st) and D(tr);
the operation WHC consisting in the transmission of the whole contribution);

(d) when a slave station receives from the master station a stop transmission order at a time t0 concerning a table T (the master station has received a new contribution for T from said slave station), it may be in either of the two following situations:
  (i) if the slave station was transmitting its contribution concerning a table T, it has to finish (if necessary) said transmission within the interval (t0, t0+delay T1) and, once this transmission is finished, it has to wait till the time (t0+delay T2) before being able to transmit an SI_modif_Packet (see FIG. 6, where is indicated said operation CTC consisting in the completed T transmission);
  (ii) otherwise the station shall not transmit any SI_modif_Packet(T) till the time (t0+T2).

The rules to be respected by the master station are the following:
(a) when the master station wants to refresh a tables it has to transmit a transmission order for this particular table
(b) when the master station receives SI_modif_Packets (T) sent by a slave station and signalling that said slave station wants to update its contribution to the table T, it has to transmit a stop transmission order for said table T;
(c) said master station can transmit an order packet concerning a table T only if it has not transmitted one since T3(=T1+2D(st)+D(tr), as previously seen);
(d) when it is time to refresh the table T, the master station transmits a transmission order, according to the following operations:
  (i) t1 being the time at which such an order is transmitted, the master station shall store during the interval (t1, t1+T1+2 D(st)) all the received SI_modif_Packets(T) in the corresponding next_T(i) blocks;
  (ii) at the time (t1+T1+2D(st)), the master station refuses all the SI_modif_Packets(T) and copies all the next_T(i) blocks in current_T;
(e) when the master station receives from a slave station the start of a new contribution for T, if said master station has not transmitted any order packet since T3, then it shall transmit a stop transmission order, according to the following operations
  (i) t1 being the time at which such a packet is transmitted, the master station shall store during the interval (t1, t1+T+2D(st)) all the received SI_modif_Packets(T) in the corresponding next_T(i) blocks;
  (ii) at the time (t1+T1+2 D(st)), the master station refuses all the SI_modif_Packets(T) and copies all the next_T(i) blocks in current_T.

What is claimed is:

1. A communication method between a plurality of stations, the method comprising:
selecting a master station, from said plurality of stations;
at said master station,
  building and broadcasting at least one service information table to the other stations, called slave stations;
  communicating with the other stations according to a table management, and when a slave station wants to update the content of its information table, and
  a slave station wants to remove its information table, and
  the master station wants to refresh the information tables of at least one of the slave stations; and
said table management is based on transmission orders, used when the master station has to refresh a table, and modify transmission orders, used when the master station has to modify the content of an information table.

2. A method according to claim 1, wherein said table management is carried out by means of the following principle, according to which the master station is always in one of three states that are either a waiting state, or a building state, or a transferring state, the following operations corresponding to said states:
  (i) in the waiting state, the master station refuses any modification of the content of any table except when one of the two following events occurs: either it is time to refresh at least one of the tables, or a slave station modifies its own contribution to one of the tables;
  (ii) one of said events having occurred, the master station transmits respectively a transmission order or a stop transmission order, and the building state begins, during which said master station stores all modifications;
  (iii) said modifications being stored, the transferring state begins, during which other modifications are no longer allowed and all modifications are copied, said master station finally returning to its waiting state.

3. A method according to claim 2, wherein the communication for said communication step are subdivided into rules to be respected by any slave station and rules to be respected by the master station, the former ones being the following:
  (a) a slave station can transmit a modification only if it has received from the master station a transmission order concerning a table or if it wants to update its own contribution to a table;
  (b) a slave station can update its own contribution to a table only if it has not received any order concerning said table since a predetermined period;
  (c) when a slave station receives from the master station a transmission order concerning a table, said transmission has to be done within a predetermined period;
  (d) when a slave station receives from the master station a stop transmission order concerning a table, it has to finish a pending transmission within a predetermined period and will be no longer able to begin a further transmission during a predetermined period;
while the latter ones are the following:
  (e) when the master station wants to refresh a table, it has to transmit a transmission order for said table;
  (f) the master station can send a transmission order only if it has not transmitted one during a predetermined previous period;
  (g) when the master station receives modifications sent by a slave station wanting to update its contribution to a table, it has to transmit a stop transmission order for said table.

4. A method according to claim 3, wherein the master station, for transmitting a transmission order or a stop transmission order, carries out the following operations:
  (i) all the modifications are first stored during a first predetermined period;
  (ii) after said period, all the modifications are copied during a second predetermined period.

* * * * *